United States Patent [19]

Iri et al.

[11] 4,264,942
[45] Apr. 28, 1981

[54] MINIATURE VARIABLE CAPACITOR PROVIDED WITH A DRIVING MECHANISM

[75] Inventors: Akio Iri, Inagi; Hideo Ito, Hidaka, both of Japan

[73] Assignee: Mitsumi Electric Co., Ltd., Chofu, Japan

[21] Appl. No.: 940,154

[22] Filed: Sep. 5, 1978

[30] Foreign Application Priority Data

| | | |
|---|---|---|
| Sep. 6, 1977 [JP] | Japan | 52-119002[U] |
| Nov. 4, 1977 [JP] | Japan | 52-147092[U] |
| Dec. 16, 1977 [JP] | Japan | 52-168224[U] |
| Feb. 23, 1978 [JP] | Japan | 53-21544[U] |

[51] Int. Cl.³ .................................... H01G 5/06
[52] U.S. Cl. ........................ 361/299; 361/298; 361/300
[58] Field of Search ............... 361/298, 299, 300, 293

[56] References Cited

U.S. PATENT DOCUMENTS

| | | | |
|---|---|---|---|
| 1,529,096 | 3/1925 | Tucker | 361/298 |
| 1,631,788 | 6/1927 | Bennett | 361/299 X |
| 1,705,734 | 3/1929 | Pacent | 361/298 |
| 1,755,181 | 4/1930 | Jacobs | 361/298 |
| 3,170,099 | 2/1965 | Sperry | 361/293 |
| 3,304,472 | 2/1967 | Sperry | 361/293 X |
| 3,360,757 | 12/1967 | Wahlberg | 361/298 X |

FOREIGN PATENT DOCUMENTS

| | | | |
|---|---|---|---|
| 1133467 | 7/1962 | Fed. Rep. of Germany | 361/298 |
| 1114940 | 5/1968 | United Kingdom | 361/293 |

Primary Examiner—Elliot Goldberg
Attorney, Agent, or Firm—Haseltine and Lake

[57] ABSTRACT

A miniature variable capacitor comprises a miniature variable capacitor main body comprising stator plates, a base plate for supporting the stator plates, and rotor plates. held to a rotor shaft and undergoing displacement, in accordance with rotation of the rotor shaft, with respect to the stator plates thereby establishing a variable changing electrostatic capacitance established between the rotor plates and the stator plates. A rotor plate driving rotary member is secured to the rotor shaft at one end thereof. The driving member is formed with a recess. The miniature variable capacitor main body is assembled or incorporated with the driving member, by rotary being fitted into the recess of the driving rotary member. The rotor shaft is integrally or unitarily formed with the driving member.

12 Claims, 17 Drawing Figures

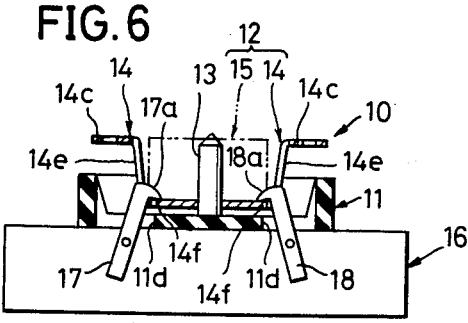
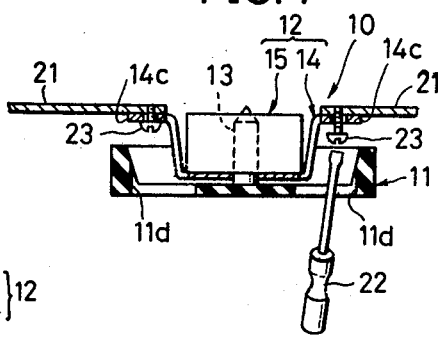
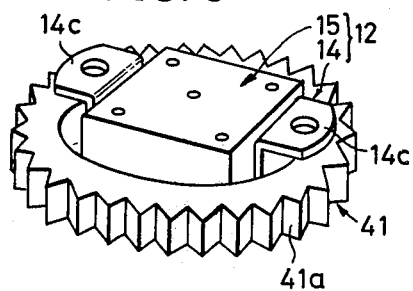
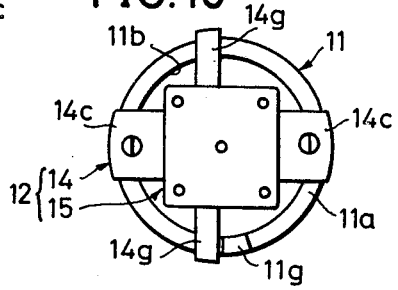
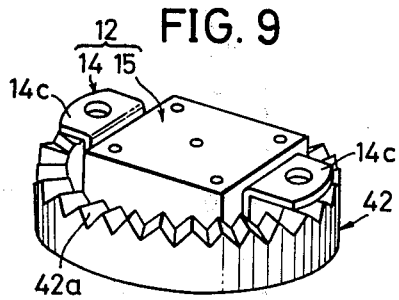
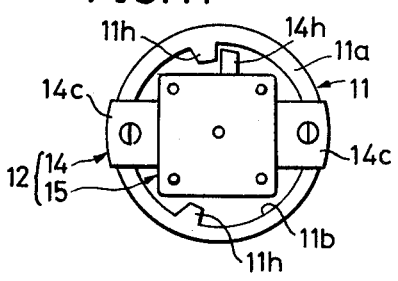

MINIATURE VARIABLE CAPACITOR PROVIDED WITH A DRIVING MECHANISM

BACKGROUND OF THE INVENTION

This invention relates generally to a miniature variable capacitor and more particularly to a miniature variable capacitor provided with a driving mechanism of a construction wherein a miniature variable capacitor main body is accommodated within a recess of a driving pulley. According to this construction, the variable capacitor is reduced its thickness dimension, thereby afford miniaturization and simplification. The miniature variable capacitor provided with a driving mechanism is appropriately applied, for instance, to a tuning apparatus in radio receiver. A rotor shaft of the variable capacitor structure is integrally formed with the driving pulley.

A miniature variable capacitor provided with a driving mechanism known heretofore has a general construction wherein a rotor shaft projects downwards from a base plate supporting thereon a variable capacitor main body consisting of stator plates and rotor plates, and a driving pulley fitted around the rotor shaft is secured thereto by a screw. When the driving pulley is rotated together with the rotor shaft for variably adjusting capacitance, a stop plate fitted to the rotor shaft comes to engagement with a pair of pins embeddedly fixed to the upper surface of the base plate, thus restricting a rotational movement of the rotor plates.

The conventional variable capacitor of the above described construction is, however, accompanied by difficulties in that the overall thickness of the driving pulley and the stop member is added to overall thickness dimension of the variable capacitor, thus causing the variable capacitor to be of a relatively larger size. In addition to this, a position where the stop plate engages with the pins is above the base plate and near the rotor shaft. This arrangement results in poor accuracy of the determination of the positions where the rotor plates stop.

Furthermore, since the driving pulley is secured to the rotor shaft by a screw, there are accompanied by difficulties in that the number of constituting elements required increases, that the number of processes required to production increases, and that looseness occurs between the driving pulley and the rotor shaft due to possible loosening of the screw, which rather lowers assembling accuracy and thereby deteriorates performances of the variable capacitor. A section of the driving pulley where the screw is screwed increases the thickness dimension of the variable capacitor.

SUMMARY OF THE INVENTION

Accordingly, it is a general object of the present invention to provide a novel and useful variable capacitor of miniature type provided with driving mechanism, in which the above described difficulties have been overcome.

A specific object of the invention is to provide a miniature variable capacitor provided with a driving mechanism in which a variable capacitor main body is accomodated in a recess of a driving pulley. The total dimensions of the variable capacitor is relatively small.

Another object of the invention is to provide a miniature variable capacitor provided with a driving mechanism in which a rotor shaft and a driving pulley are integrally formed. According to this construction, the variable capacitor are miniaturized. The variable capacitor operates with high accuracy. Furthermore, the number of assembling process can be reduced.

A further object of the present invention is to provide a miniature variable capacitor provided with a driving mechanism in which a base plate and a driving pulley are unitarily clamped with ease previously for assembling a variable capacitor main body onto the base plate. The clamping of base plate and the driving pulley facilitates the succeeding works in assembling the variable capacitor main body.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 6 is a side view, in section, for a description of assembling a variable capacitor main body;

FIG. 7 is a side view, in section, for a description of mounting a miniature variable capacitor provided with a driving mechanism of the present invention to a supporting plate;

FIG. 8 is a perspective view, showing another embodiment of a driving pulley;

FIG. 9 is a perspective view, showing a still another embodiment of a driving pulley;

FIG. 10 is a plan view, showing a second embodiment of a mechanism for restricting rotation of rotor plates;

FIG. 11 is a plan view, showing a third embodiment of the mechanism for restricting of rotor plates;

DETAILED DESCRIPTION

Figure 1:
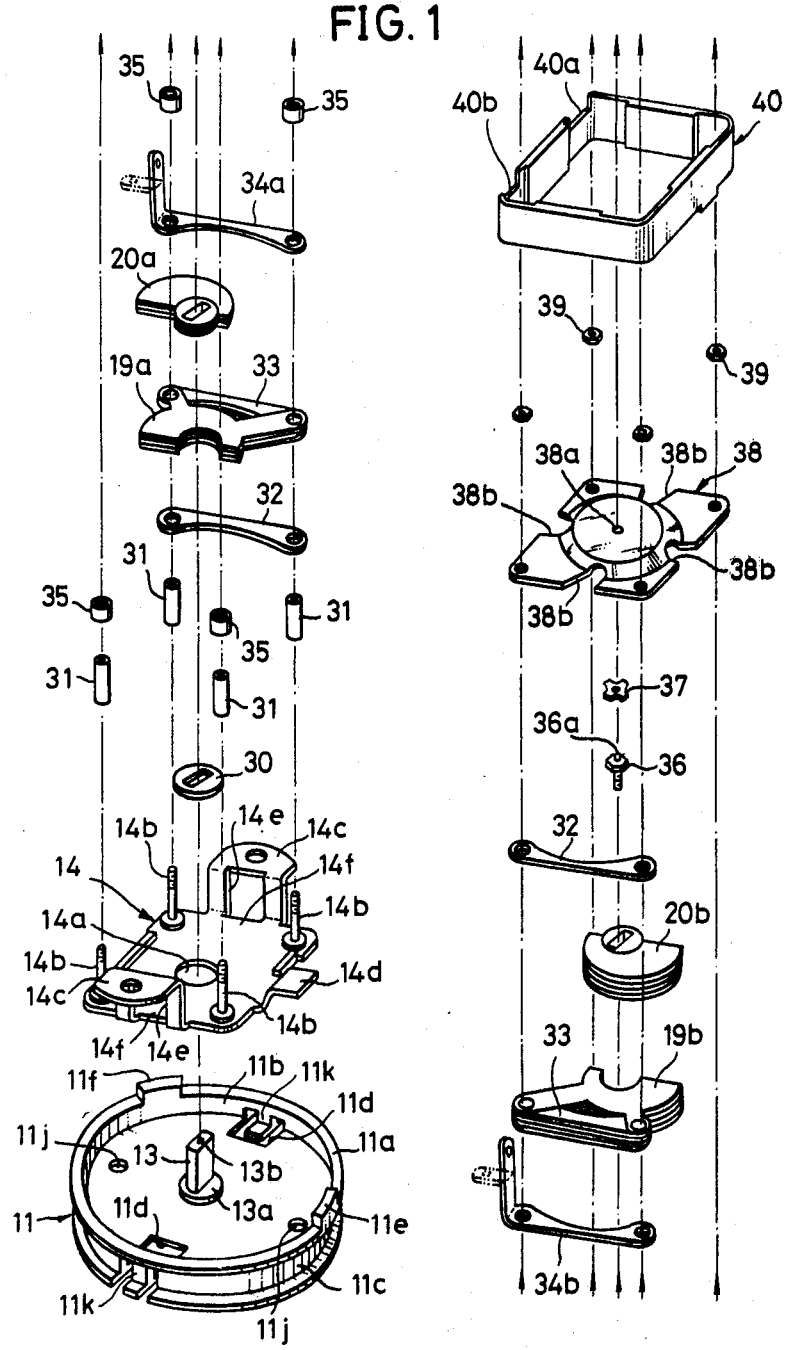
FIG. 1 is an exploded perspective view showing one embodiment of a miniature variable capacitor provided with a driving mechanism, according to the present invention.

The general construction of one embodiment of a miniature variable capacitor provided with a driving mechanism according to the present invention will be described with reference to FIGS. 1 through 5.

A miniature variable capacitor 10 provided with a driving mechanism has a general structural organization in which a part of a miniature variable capacitor main body 12 is accommodated within a recess 11b of a driving pulley 11. The driving pulley 11 is integrated with a rotor shaft 13 made of metal by insert-moulding, to be a shape of relatively flat hollow cylinder closed at the bottom. The pulley 11 thus moulded of synthetic resin has a cylindrical wall part 11a, the recess 11b, and a peripheral groove 11c. A pair of openings 11d and 11d are formed in a closing bottom disc part of the pulley 11 at diametrically opposite positions. A minimum distance between the pair of openings 11d and 11d is $l_1$. A pair of through-holes 11j and 11j are further formed at diametrically opposed positions. A line passing through the pair of openings 11j and 11j is perpendicular to a line passing through the pair of openings 11d and 11d. A pair of projections 11e and 11f is integrally formed with the cylindrical wall part 11a on the top surface thereof.

Figure 4:
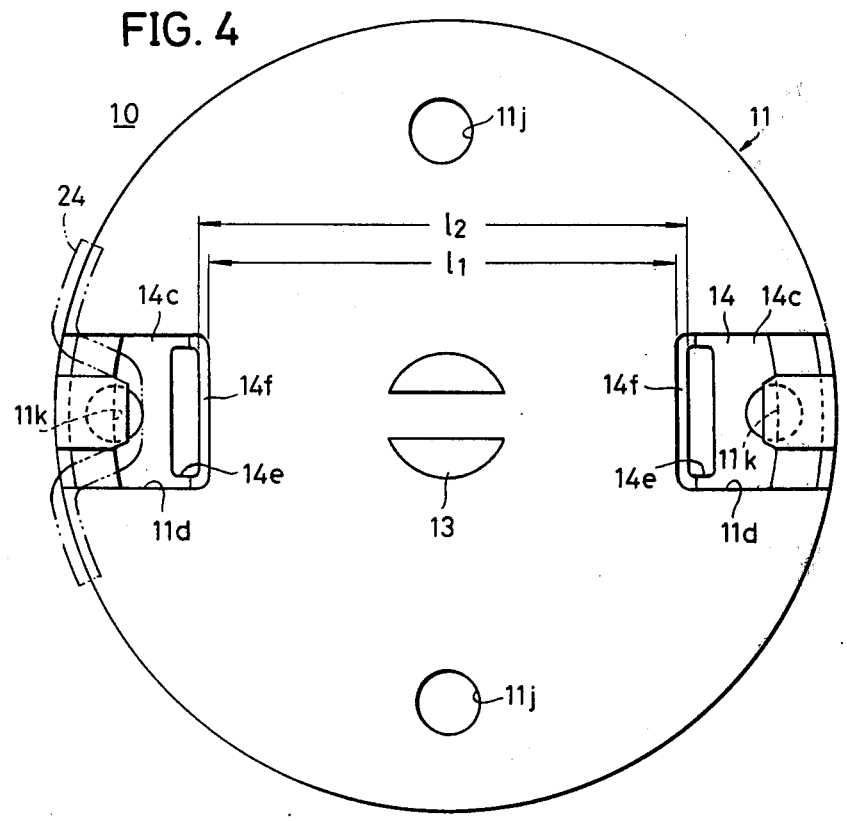
FIG. 4 is a bottom view of the miniature variable capacitor provided with the driving mechanism indicateded in FIG. 2.
Figure 16:
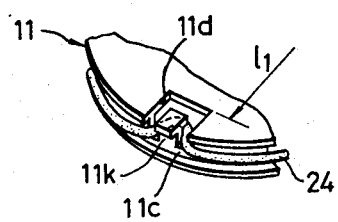
FIG. 16 is a fragmentary perspective view, showing an essential part of the driving pulley, as viewed from the bottom.

Moreover, on the peripheral groove 11c at positions of the openings 11d and 11d, there are formed a pair of hooks 11k and 11k to be hooked by a string or cord 24 described hereinafter, as indicated in FIG. 1, FIG. 4, and FIG. 16.

The metal rotor shaft 13 is a substantially elliptical rod having a section, and is formed, at its lower part, with a journal 13a, and at its top, with internal threads 13b.

Here, since the pulley 11 and the rotor shaft 13 assume an integrated structure through moulding, various features will be obtained in compared with the conventional screw-fastened structure, such that the pulley 11 is secured tightly to the rotor shaft 13 without any accompanying looseness through other assembling processes, and with a higher accuracy as to mutual positions in their peripheral directions and perpendicularity between them. Moreover, no excessive load is applied to the rotor shaft 13, which leads to further improvement of characteristics of the variable capacitor. Furthermore, the miniature variable capacitor is reduced its thickness dimension due to elimination of a screw, thus leading to more flat structure. Still furthermore, a thickness of a part where the pulley 11 and the rotor shaft 13 are connected can be reduced, thus further decreasing overall thickness dimension of the miniature variable capacitor 10.

Figure 2:
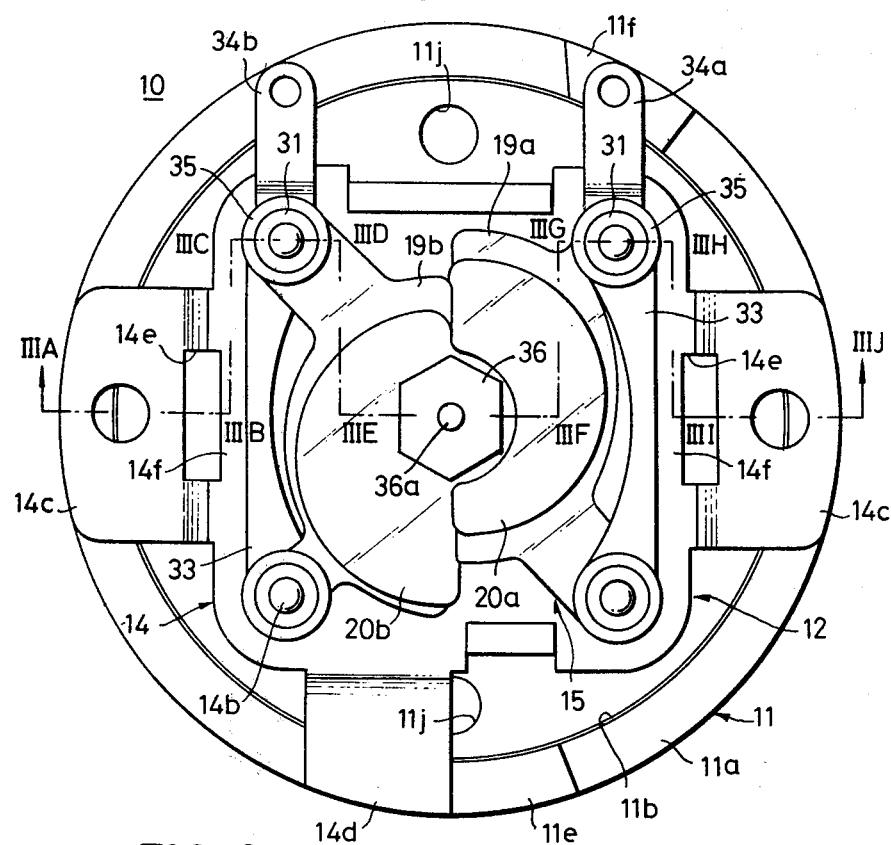
FIG. 2 is a plan view of the miniature variable capacitor provided with the driving mechanism indicated in FIG. 1.
Figure 5:
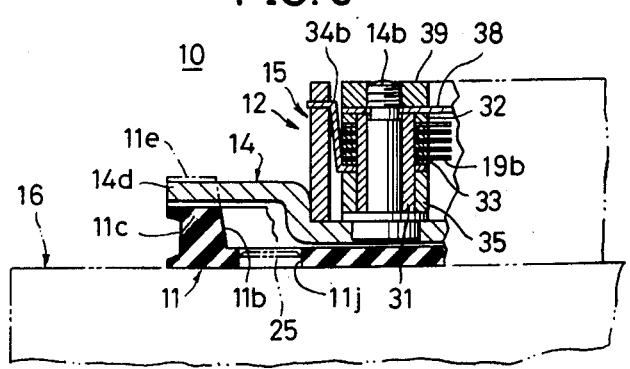
FIG. 5 is a vertical section, showing an essential part of the miniature variable capacitor provided with driving mechanism, shown in FIG. 2.

The miniature variable capacitor main body 12 has a base plate 14. The base plate 14 has an opening 14a formed at substantially center part thereof to support the journal 13a, a pair of mounting lugs 14c and 14c bent and formed at its opposite sides, and a stop lug 14d bent and formed so as to engage the pair of projections 11e and 11f as the pulley 11 rotates, as indicated in FIGS. 2 and 5. Four pins 14b threaded at their top parts are embeddedly fixed to the base plate 14.

Moreover, square openings 14e and 14e are respectively formed in the pair of mounting lugs 14c and 14c at their vertical wall parts, which thereby forms a pair of opposite end-sections 14f and 14f on the bottom of the base plate 14. A distance between lateral surfaces of the pair of opposite sections 14f and 14f is set to $l_2$, where $l_2 > l_1$.

According to this arrangement, the sections 14f and 14f respectively extend, by a small amount, to the openings 11d and 11d of the pulley 11, as indicated in FIG. 4 viewed from the bottom of the miniature variable capacitor 10.

When a variable capacitor mechanism 15 described hereinafter is to be assembled into a sub-assembly of the base plate 14 and the pulley 11, the sub-assembly is layed onto the upper surface of a jig base 16, as indicated in FIGS. 5 and 6.

A pair of locating pins 25 (on one pin 25 being indicated in FIG. 5) are embeddedly fixed on the jig base 16, at their predetermined positions. In addition, a pair of clamp arms 17 and 18, respectively having clamp claws 17a and 18a at their tops, are rotatably provided side by side in the jig base 16.

The pulley 11 is layed onto the jig base 16, with the through-holes 11j 11j being fitted around the locating pins 25, thereby placed at a predetermined position. The pair of clamp claws 17a and 18a respectively pass through the openings 11d and 11d of the pulley 11.

Then, the clamp arms 17 and 18 are forced to rotate toward inside so that they pass through the square openings 14e and 14e and clamp the opposite end sections 14f and 14f of the base plate 14. Thus, the pulley 11 and the base plate 14 are firmly mounted on the jig base 16, and thereafter the operation of assembling the variable capacitor mechanism 15 to the base plate 14 is carried out.

This jig device to be applied to the variable capacitor of the present invention has a miniaturized structure in compared with the conventional jig device which is adapted to clamp the mounting lugs of the base plate by the clamp arms. Moreover, since the end-sections 14f and 14f clamped by the clamp claws 17a and 18a are in the close vicinity of the upper surface of the jig base 16, the base plate 14 (and the pulley 11) can be positioned at a predetermined positions through simple manipulation of the clamp arms 17 and 18. Furthermore, since the clamp arms 17 and 18 do not project unnecessarily upwards into a space for accommodating the variable capacitor mechanism 15, work or operation for assembling the statar plates 19 and rotor plates 20 is facilitated.

Moreover, the pair of openings 11d and 11d in the pulley 11 facilitates screw-fastening operation through the use of a screwdriver 22, as indicated in FIG. 7. The base plate 14 is fastened by screws 23 through the hole of the mounting lugs 14c to a chassis 21 of an electrical unit.

Next, the elements of the variable capacitor mechanism 15 are successively fitted to the sub-assembly mounted on the jig base 16.

Figure 3:
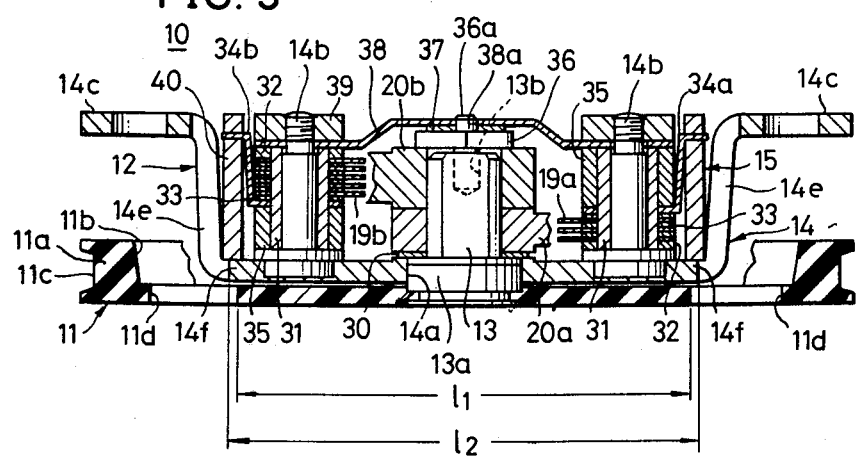
FIG. 3 is a vertical section of the miniature variable capacitor provided with the driving mechanism in FIG. 2, taken along the line IIIA–IIIB through III I–IIIJ as viewed in the arrow direction.

Referring to FIGS. 1 and 3, a washer 30 is fitted around the rotor shaft 13, and insulating sleeves 31 made of ceramics are respectively fitted around respective pins 14b. The base plate 14 is electrically conducted to the rotor shaft 13, and the pair of mounting lugs 14c and 14c have an additional function of grounding the rotor plate group.

Referring to FIGS. 1 and 2, around the pair of insulating sleeves 31 and 31 at the right side, an insulating washer 32 made of polyethylene, a plurality of electro-conductive stator plates 19a, washers 33, a terminal plate 34a, and an insulating bush 35 having small longitudinal dimension are successively fitted. The plurality of stator plates 19a confront alternately a plurality of rotor plates 20a which are fitted around the rotor shaft 13 so as to rotate unitarily therewith. Similarly, around the other pair of insulating sleeves 31 and 31, an insulating bush 35 having small longitudinal dimension, a terminal plate 34b, a plurality of electro-conductive stator plates 19b, washers 33, and an insulating washer 32 are successively fitted. The stator plates 19b confront alternately a plurality of rotor plates 20b which are further fitted around the rotor shaft 13. Thereafter, a bolt 36 is threaded into the internal threads 13b of the rotor shaft 13, thus the above described rotor plates 20a and 20b being tightly secured around the rotor shaft 13. A washer 37 is fitted to a projection 36a on the bolt head.

A thin cover or rear plate 38 is formed, at a center thereof, with a through-hole 38a and, near four sides thereof, with cuts 38b. This rear plate 38 is fitted to four pins 14b, with the through-hole 38a fitted around the projection 36a, and secured thereto by nuts 39.

Finally, a casing 40 of square frame made of synthetic resin is engaged with the periphery of the base plate 14 and is fitted thereto. Then, the terminal plates 34a and 34b are bent at their top parts as indicated by two-dot chain line in FIG. 1 thereby to engage respectively with a pair of cuts 40a and 40b of the casing 40, thus holding the casing 40.

Accordingly, assembling of the variable capacitor mechanism 15 to the pulley 11 and the base plate 14 is now completed, as indicated in FIG. 2 through FIG. 4. Thus assembled miniature variable capacitor having driving mechanism is then screw fastened at the pair of mounting lugs 14c and 14c to the chassis 21 of the unit as indicated in FIG. 7.

The above described miniature variable capacitor 10 has a structural organization in which the miniature variable capacitor main body 12 sinks down at its lower part into the recess 11b of the pulley 11. This organization thereby makes dimensions of overall thickness of the unit including the miniature variable capacitor main body 12 and the pulley 11 considerably small, thus the overall structure being of flat type.

Moreover, the projections 11e and 11f of the pulley 11 and the stop lug 14d of the base plate 14, which cooperatively operate to define rotational angular extent of the rotor plates 20a and 20b as described hereinafter, does not whatsoever take part for increasing the thickness dimension of the overall structure.

Therefore, according to this structural organization, the overall structure of the miniature variable capacitor 10 provided with the driving pulley 11 is made thinner. Moreover, the mechanical strength of stop mechanism can be improved by increasing thickness of the projections 11e and 11f and the stop member 14d, without any increase of the total thickness dimension.

Here, the recess 11b of the pulley 11 is not required inevitably, and the pulley 11 may be a flat disc shape without the recess 11b.

Furthermore, the rotor plates 20a and 20b are clamped by the bolt 36 around the rotor shaft 13. Thickness of a bolt head is generally made thinner than that of a nut. Accordingly, in compared with the conventional construction of using the nut for securing the rotor plate, the above described structure can be organized of further thinner type.

As the nuts 39 are screwed, the rear plate 32 bends elastically to form substantially cone shape with the center supported by the bolt 36 as vertex, thus imparting elastic force to the rotor shaft 13 in its axial direction downwardly. A magnitude of this elastic force is properly set by changing the shape and size of four cuts 38b so as not to affect rotational torque required to rotate the rotor shaft 13.

Next to be described is the operation of the above described miniature variable capacitor 10 provided with the driving mechanism including the driving pulley 11.

For operating the miniature variable capacitor 10, that is, for tuning operation, the pulley 11 is rotated. When the pulley 11 is driven to rotate by a belt (not shown) or a cord 24 which is hooked at its specific part to the hook 11k for preventing any unwanted sliding and then wound around the groove 11c, as indicated in FIGS. 4 and 6, the rotor shaft 13, which is rotatably supported at its journal 13a and the projection 36a of the bolt 36 respectively by the base plate 14 and the rear plate 38, rotates together with the pulley 11.

As the rotor shaft 13 rotates, the rotor plates 20a and 20b rotate to change areas confronting the stator plates 19a and 19b respectively. Thus respective capacitances formed between the mounting lugs 14c as a rotor-side earth member and respective terminal plates 34a and 34b are variably adjusted.

Referring back to FIG. 2, the clockwise rotation of the pulley 11 is restricted at a position where the projection 11e abuts against the stop lug 14d, and the counterclockwise rotation of the pulley 11 is restricted at a position where the other projection 11f abuts against the stop lug 14d. Accordingly, the rotor plates 20a and 20b undergo rotation over an angular range of approximately 180 degrees.

Here, the projections 11e and 11f, and the stop lug 14d are respectively disposed at positions much further separated from the rotor shaft 13 in the radial direction, in compared with the conventional variable capacitor. As one result of this arrangement, accuracy of the position where the rotation of the rotor shaft 13 is restricted can be improved. As another result of the above described arrangement, a force applied to the stop lug 14d when the projections 11e and 11f abut against the stop lug 14d becomes relatively small. Accordingly, the stop lug 14d may be sufficient to be small size having less mechanical strength. Moreover, the pulley 11 having thinner cylindrical wall part may be adopted, which pulley 11 can be produced at low cost due to any reduction of amount of raw material.

Moreover, instead of the pair of projections 11e and 11f, a single projection extending in the counterclockwise direction from the projection 11e to the projection 11f along the cylindrical wall part 11a, with uniform width, may be used.

Furthermore, the above described embodiment is of structural organization in which the pulley 11 is provided to the miniature variable capacitor main body 12, the present invention is not limited to this, but modifications as indicated in FIGS. 8 and 9 may be made.

In another embodiment indicated in FIG. 8, a miniature variable capacitor main body 12 is accommodated within a recess of a gear wheel structure 41 formed around its outer periphery with gear teeth 41a. The gear wheel structure 11 is driven to rotate by a driving gear (not shown) meshed therewith.

In still another embodiment indicated in FIG. 9, a miniature variable capacitor main body 12 is accommodated within a recess of a crown gear wheel structure 42 formed around its top with gear teeth 42a. This crown gear wheel structure 42 is driven to rotate by a pinion (not shown) meshed therewith.

Moreover, a manual rotary knob may be provided, instead of the pulley 11. Graduations may be preferably marked around the rotary knob or panel around the rotary knob, for indicating the rotational position of the knob.

Moreover, a mechanism for restricting rotation of the rotor plates 20a and 20b may be modified as indicated in FIGS. 10, 11, 12A and 12B.

In another embodiment indicated in FIG. 10, a single projection 11g is formed on the pulley 11, and this projection 11g comes to abut respectively against a pair of stop lugs 14g provided in the miniature variable capacitor main body 12.

In still another embodiment indicated in FIG. 11, a pair of projections 11h and 11h are formed on an inner side wall of the cylindrical wall part 11a of the pulley 11. Either of projections 11h comes to abut against a single stop lug 14h of the miniature variable capacitor main body 12.

In the above described embodiments, if one projection or stop member among the pair of projections or stop members is removed off, the angular range of the rotor plates 20a and 20b will be extended further to 360 degree approximately. Moreover, the angular range of the rotor plate can be determined to any given angular range by appropriately disposing a pair of projections or stop lugs.

To the structures indicated in FIGS. 8 and 9, any of mechanisms for restricting rotation of rotor plates, indicated in FIGS. 10 and 11, may be applied. Particularly, the rotation restriction mechanism indicated in FIG. 11 is preferably applied to the embodiment indicated in FIG. 9.

The above described mechanisms for restricting rotation of rotor plates 20 are respectively of structural organization in which the base plate 14 is further formed with the stop lug 14d or stop lugs 14g and 14h, in addition to the mounting lug 14c. However, the mechanisms for restricting rotation of the rotor plates are not limited thereto, but may be organized in such a manner that the mounting lug 14c operates also as stop member, without providing the stop lug 14d, as indicated in FIGS. 12A and 12B.

Figure 12A:
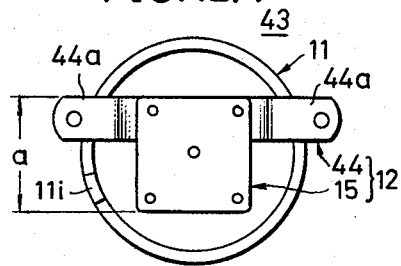
FIGS. 12A and 12B are a plan view and a vertical section, respectively, showing a fourth embodiment of the mechanism for restricting rotation of rotor plates.
Figure 12B:
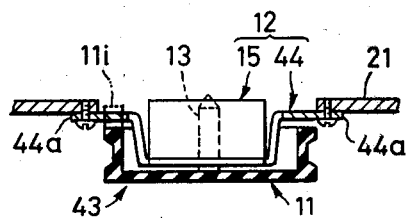

In the same figures, a base plate 44 of a miniature variable capacitor 43 has a pair of mounting lugs 44a and 44a, which project outwards in the horizontal direction in FIG. 12A at a position deviated by a specific distance from a center of the variable capacitor. Here, a reason why the mounting lugs 44a are deviated from the center position of the variable capacitor resides in that the pulley 11 (or rotor plate 20) positively rotate over a rotational angle of about 180 degrees. A projection 11i on the pulley 11 projects to a height position equal to that of respective mounting lugs 44a. The miniature variable capacitor 43 provided with the pulley 11 is screw fastened at the pair of mounting lugs 44a and 44a to the chassis 21, as indicated in FIG. 12B.

When the pulley 11 is driven to rotate in the clockwise or counterclockwise directions in FIG. 12A, the rotor shaft 12 rotate together therewith over an angular range of about 180 degrees, which is defined by positions where projection 11i comes to abut against opposite mounting lug 44a or 44a, thus capacitance value being adjusted variably.

According to this structural organization, the base plate 44 is not required to have any special stop lug. Therefore, a width a of the base plate 44 is reduced by the dimension of the stop lugs, in compared with the above described respective embodiments indicated in FIG. 2, FIG. 10, and FIG. 11, which thereby leads to miniaturization of the shape of base plate before subjected to press work. Moreover, since the mounting lugs 44a are secured to the chassis 21 and thereby firmly positioned, the rotation of the pulley 11 can be restricted with stableness at specific positions.

The rotational angle of the pulley 11 is not limited to 180 degrees, but may be set to any other angle of degrees, by changing a position where the mounting lugs 44 are formed, and a shape and a number of projections 11i.

Figure 13:
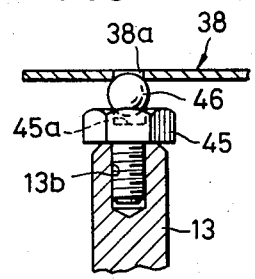
FIG. 13, FIG. 14, and FIG. 15 are vertical sections, respectively, showing other embodiments of a bearing mechanism for rotatably supporting a rotor shaft.
Figure 14:
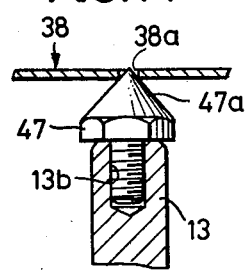
Figure 15:
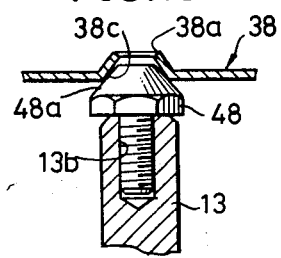

Other embodiments of the bearing structure of the bolt 36 and the washer 37 indicated in FIG. 3 are indicated in FIG. 13 through FIG. 15.

In the embodiment indicated in FIG. 13, a bolt 45 is formed at the top thereof with a recess 45a, and a steel ball 46 engaged its lower portion within the recess 45a engages its upper portion through the through-hole 38a of the rear plate 38, whereby the rotor shaft 13 is supported rotatably.

In the embodiment indicated in FIG. 14, a bolt 47 is formed at the top thereof with a circular cone 47a, and the circular cone 47a is fitted its top part into the through-hole 38a of the rear plate 38. In the embodiment indicated in FIG. 15, a bolt 48 is formed at the top thereof with a circular truncated cone 48a, and this circular truncated cone 48a fits into a pivot bearing 38c which is formed by bending periphery of the through-hole 38a upwards.

Moreover, the above described embodiments is of organization using the base plate 14 made of metal, but, the base plate may be made of insulation material such as synthetic resin, and the metal pins 14b are embededdly fixed thereto through engagement thereto or insert moulding.

In this embodiment, there is so arranged that the rear plate 38 is used as rotor-side earth member.

Further, this invention is not limited to these embodiments but various variations and modifications may be made without departing from the scope of the invention.

What is claimed is:

1. A miniature variable capacitor comprising:
   a miniature variable capacitor main body comprising stator plates, a base plate including pins fixed thereto for supporting said stator plates, and rotor plates held to a rotor shaft and undergoing displacement, in accordance with rotation of said rotor shaft, with respect to said stator plates thereby variably changing electrostatic capacitance established between said rotor plates and said stator plates; and
   a rotary member for driving said rotor plates, said rotary driving member being secured to said rotor shaft at one end thereof, said base plate of said miniature variable capacitor main body including at least one projection plate part extending sidewards outside the variable capacitor main body;
   said rotary driving member being of a relatively thin flat cylindrical shape and having a recess to accommodate said miniature variable capacitor main body therein, said rotary driving member including at least one engagement part which comes into engagement with said projection plate, causing rotation of said rotary driving member to be restricted to specific rotational angular range limit positions, and further including a driven part in an outer peripheral region thereof.

2. A miniature variable capacitor as claimed in claim 1 in which said main body further comprises an elastic rear plate which is fixed to said pins for imparting elastic force to the rotor shaft in its axial direction.

3. A miniature variable capacitor as claimed in claim 1 in which said base plate of said miniature variable capacitor main body further comprises extending lugs to be mounted and secured to a mounting part which is a member separated from said miniature variable capacitor.

4. A miniature variable capacitor as claimed in claim 3 in which said extending lugs also have the function of said projection plate which comes into engagement with the engagement part and have configurations to be mounted and secured to a mounting part which is a member separated from said miniature variable capacitor.

5. A miniature variable capacitor as claimed in claim 1 in which said rotor shaft is formed integrally or unitarily with said rotary driving member.

6. A miniature variable capacitor as claimed in claim 1 in which said rotary driving member is formed near the outer periphery thereof with a pair of openings.

7. A miniature variable capacitor as claimed in claim 6 in which said openings have such a size and shape that a part of said base plate extends into said openings, through which openings jigs for pressing and clamping said base plate of said miniature variable capacitor main body against said driving rotary member are allowed to be inserted upon assembling.

8. A miniature variable capacitor as claimed in claim 1 in which said driving rotary member is formed with a pair of holes to be fitted, upon assembling, with projections on an assembling base.

9. A miniature variable capacitor as claimed in claim 1 in which said driven part of the rotary driving member comprises a groove part to be wound by a cord or a belt.

10. A miniature variable capacitor as claimed in claim 1 in which said driven part of the rotary driving member comprises teeth to be meshed and driven.

11. A miniature variable capacitor comprising:
a miniature variable capacitor main body comprising stator plates, a base plate for supporting said stator plates, and rotor plates held to a rotor shaft and undergoing displacement, in accordance with rotation of said rotor shaft, with respect to said stator plates thereby variably changing electrostatic capacitance established between said rotor plates and said stator plates; and
a rotary driving member for said rotor plates, said rotary driving member being secured to said rotor shaft at one end thereof, said rotor shaft being formed integrally or unitarily with said driving rotary member, said base plate of said miniature variable capacitor main body having at least one projection plate part extending outside, and said rotary driving member having at least one engagement part which comes into engagement with said projection plate part, causing rotation of said rotary driving member to be restricted to specific rotational angular range limit positions.

12. A miniature variable capacitor comprising:
a miniature variable capacitor main body comprising stator plates, a base plate for supporting said stator plates, and rotor plates held to a rotor shaft and undergoing displacement, in accordance with rotation of said rotor shaft, with respect to said stator plates thereby variably changing electrostatic capacitance established between said rotor plates and said stator plates; and
a rotary driving member for said rotor plates, said rotary driving member being secured to said rotor shaft at one end thereof, said rotor shaft being formed integrally or unitarily with said driving rotary member, said base plate of said miniature variable capacitor main body being formed with extending lugs to be mounted and secured to a mounting part which is a member separated from said minature variable capacitor, and said rotary driving member having an engagement part which comes into engagement with said extending lugs, causing rotation of said driving rotary member to be restricted to specific rotational angular range limit positions.

* * * * *